United States Patent
Vlasov et al.

(10) Patent No.: US 12,032,760 B2
(45) Date of Patent: Jul. 9, 2024

(54) MOTORIZED SCROLL WHEEL FOR AN INPUT DEVICE

(71) Applicant: Logitech Europe S.A., Lausanne (CN)

(72) Inventors: Maxim Vlasov, Geneva (CH); Jan Stoeckli, Jongly (CH); Baptiste Merminod, Dommartin (CH); Cyril Yves Anthony Drezet, Dommartin (CH); Nicolas Ramond, Chalet les Castor Laprau Lugrin (FR); Jean-Claude Dunant, Fey (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/957,755

(22) Filed: Sep. 30, 2022

(65) Prior Publication Data
US 2023/0280847 A1 Sep. 7, 2023

Related U.S. Application Data

(60) Provisional application No. 63/294,020, filed on Dec. 27, 2021.

(51) Int. Cl.
*G06F 3/0362* (2013.01)
*G05G 1/08* (2006.01)
*G06F 3/0354* (2013.01)

(52) U.S. Cl.
CPC ............ *G06F 3/0362* (2013.01); *G05G 1/08* (2013.01); *G06F 3/03543* (2013.01); *G05G 2700/02* (2013.01)

(58) Field of Classification Search
CPC .................................................... G06F 3/0362
See application file for complete search history.

(56) References Cited

U.S. PATENT DOCUMENTS

| | | |
|---|---|---|
| 2017/0152058 A1* | 6/2017 | Morellec .................. G08B 6/00 |
| 2017/0262083 A1* | 9/2017 | Huang ..................... G06F 3/016 |
| 2019/0295362 A1* | 9/2019 | Pececnik ............. G07F 17/3267 |
| 2019/0332064 A1* | 10/2019 | Greenslade ............. G06F 3/038 |
| 2020/0004346 A1* | 1/2020 | Vlasov ................ G06F 3/03543 |
| 2021/0291951 A1* | 9/2021 | Gai ........................ G05G 9/047 |

* cited by examiner

*Primary Examiner* — Chun-Nan Lin
(74) *Attorney, Agent, or Firm* — Kilpatrick Townsend & Stockton LLP

(57) ABSTRACT

A peripheral device may include a body. The device may include a scroll wheel rotatably coupled with the body. The scroll wheel may include a ferromagnetic rotor. The rotor may be generally annular and may define an open interior. The rotor may define a first plurality of teeth arranged about a periphery of the open interior. The device may include a stator disposed within the open interior. The stator may define a second plurality of teeth that are alignable with the first plurality of teeth. The stator may include a plurality of electro-permanent magnets. Each of the electro-permanent magnets may be disposed within a conductive coil. The device may include a position sensor that is configured to detect an angular position of the rotor. The device may include control circuitry that controls delivery of current to the electro-permanent magnets of the stator to controls a speed of the scroll wheel.

14 Claims, 11 Drawing Sheets

MOTORIZED SCROLL WHEEL FOR AN INPUT DEVICE

CROSS-REFERENCES PARAGRAPH FOR RELATED APPLICATIONS

This application is a non-provisional application and claims the benefit and priority of U.S. Provisional Application No. 63/294,020, filed on Dec. 27, 2021, and titled "MOTORIZED SCROLL WHEEL FOR AN INPUT DEVICE," which is hereby incorporated by reference in its entirety for all purposes.

BACKGROUND OF THE INVENTION

Users often utilize an input device, such as a computer mouse, to navigate webpages, documents, and other screens and interfaces on computing devices. For example, users often use such input devices to scroll or otherwise navigate to earlier or later sections of the screen. When scrolling up and down longer webpages and documents, a user must often interact with a scroll wheel of a mouse numerous times to reach a desired position, such as a bottom, of the document. This can be time consuming and uncomfortable for a user, and may result in a jerky user experience as the user continually rotates a scroll wheel to advance the screen. Therefore, improvements in scroll wheels are desired.

BRIEF SUMMARY OF THE INVENTION

Embodiments of the present invention are directed to motorized scroll wheels for an input device, such as a computer mouse, that may assist users in scrolling longer documents and webpages. For example, when activated, the motorized scroll wheels may automatically advance a position of a webpage or document, which may speed up, smooth out, and/or otherwise simplify the user's scrolling experience. The motorized scroll wheels may be driven to match the speed of a user input to the scroll wheel, or may be driven at a faster or slower speed. Additionally, the motor-driven actuation of the scroll wheels may be stopped when the end of a document, webpage, or other screen is detected.

BRIEF DESCRIPTION OF THE DRAWINGS

A further understanding of the nature and advantages of the disclosed technology may be realized by reference to the remaining portions of the specification and the drawings.

Figure 1:
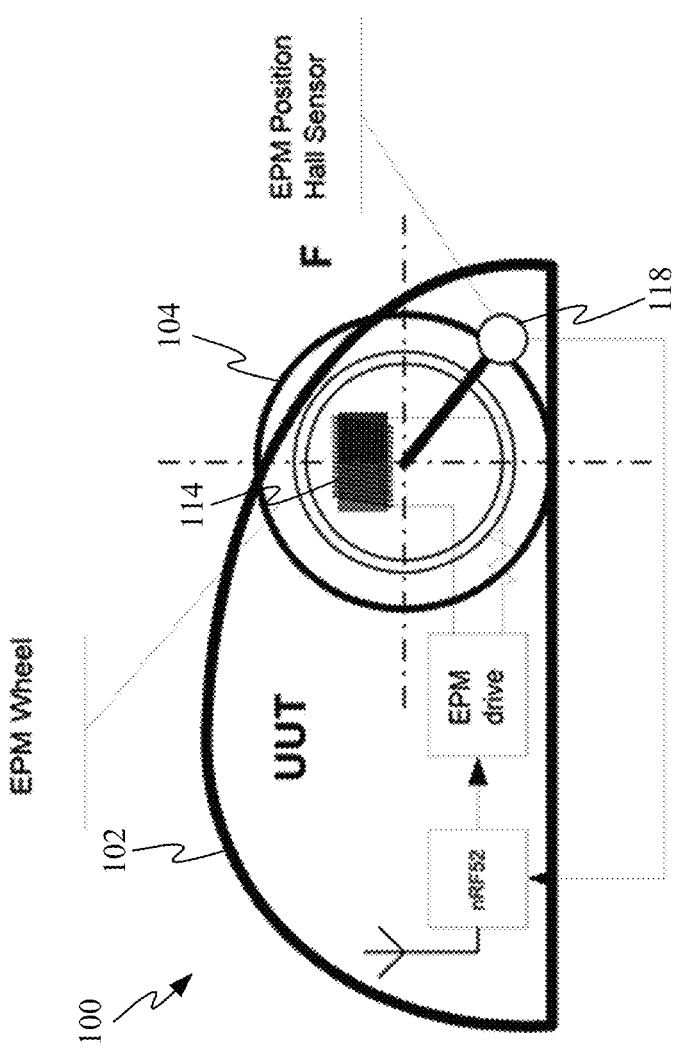
FIG. 1 illustrates a side elevation view of a peripheral device according to embodiments of the present invention.

Several of the figures are included as schematics. It is to be understood that the FIGS. are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are generally directed to a peripheral device controlling a host device. More specifically, and without limitation, this disclosure relates to a computer mouse controlling a computer. A peripheral device, such as a computer mouse, can be used to control one or more functions of a host computing device. An example of a computer mouse is further described in U.S. Pat. No. 6,400,356, issued on Jun. 4, 2002. Peripheral devices in accordance with the present invention may include motorized scroll wheels, which may be used to automate the scrolling process of a document, webpage, and/or other screen or user interface on the host device. The peripheral devices may include an electro-permanent magnet (EPM) motor to drive the rotation of the scroll wheel. The motorized rotation of the scroll wheel may eliminate the need for a user to continually interact with the scroll wheel to navigate a document or webpage, and may be particularly useful when a user desires to navigate across a lengthy interface. In some embodiments, the motorized actuation of the scroll wheel may include rotation at a constant speed, or may include accelerating and/or decelerating the scroll wheel.

Embodiments of motorized scroll wheels may enable various functionality of the peripheral device. For example, the motorized scroll wheel may be able to 1) brake and/or otherwise stop at a requested position, such as at the end of a document and/or in response to a user input, 2) provide continuous rotation with a requested (or other) speed, 3) provide context driven variable torques and/or speeds, such as based on user input parameters (e.g., scrolling force, speed, direction, etc.), 4) provide programmable hold torque, which may be based on user input, 5), provide zero torque rotation (e.g., free spinning of the scroll wheel), 6) provide adjustable continuous friction, 7) provide and/or adjust a number of ratchets or other tactile scroll indicators per turn, 8) provide an adjustable ratchet interval change, 9) provide user notifications using haptic feedback, and/or other functions.

Figure 1A:
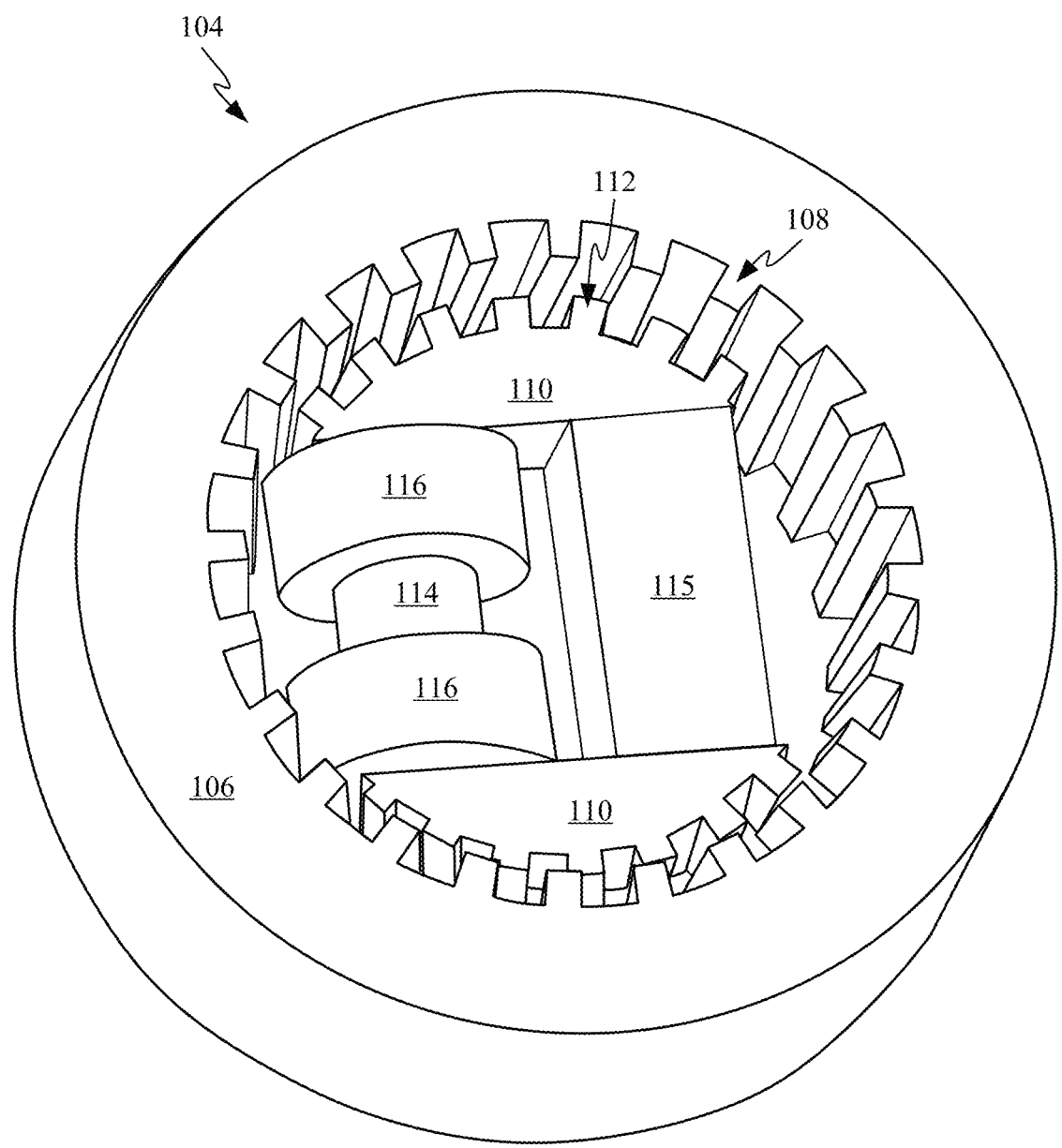
FIG. 1A illustrates an isometric view of a scroll wheel of the peripheral device of FIG. 1.

Turning now to FIG. 1, a peripheral device 100 is illustrated. Peripheral device 100 may be any input device that may be used to interact with a host device, such as a computing device. As illustrated, the peripheral device 100 is in the form of a computer mouse, although other forms of peripheral devices are possible in various embodiments. Peripheral device 100 may include a body 102 that may be graspable by a user. A scroll wheel 104 may be rotatably coupled with the body 102, with at least a portion of the scroll wheel 104 extending beyond the body 102. As best illustrated in FIG. 1A, the scroll wheel 104 may include a ferromagnetic rotor 106, an outer surface of which may be at least partially covered by a polymeric material in some embodiments. The ferromagnetic rotor 106 may be generally annular in shape and may define an open interior. The ferromagnetic rotor 106 may define a first plurality of teeth 108 arranged about a periphery of the open interior. A stator 110 may be disposed within the open interior of the ferromagnetic rotor. Although not illustrated, the stator 110 and/or rotor 106 may be mounted on a shaft and/or bearing that are coupled with the body 102 to facilitate rotation of the scroll wheel 104. The stator 110 may be maintained within a housing (not shown). The stator 110 may, define a second plurality of teeth 112 that are at least substantially alignable with the first plurality of teeth 108. Some angular offset is provided between the teeth 108, 112, which may be achieved by the size and/or intervals between the teeth 108, 112, and/or due to slight misalignments due to manufacturing tolerances. The stator 110 may include a number of electro-permanent magnets (EPM) 114, with each EPM 114 being disposed within a conductive coil 116 that enables the magnetic field of the EPM 114 to be adjusted by controlling the current applied through the coil 116. A number of permanent magnets 115 may be provided within the stator 110.

Once the EPM 114 magnet is magnetized (e.g., both polarity and magnetic intensity) via current applied through the coil 116, the power through the coil 116 can be shut off and the EPM 114 maintains its newly established magnetic field intensity without any additional power needed to maintain it. As such, any desired feedback profile can be achieved, thereby allowing multiple settings for certain features such as linearly adjustable input elements (e.g., buttons, keys, triggers, support structures, etc.), rotationally adjustable input elements (e.g., scroll wheels, knobs, gaming wheels and/or pedals, hinges, etc.), or the like. A magnetic field in an EPM assembly can be shut off in a similar manner, as well as different levels of magnetic intensity by varying the current pulse and amplitude, as would be appreciated by one of ordinary skill in the art with the benefit of this disclosure.

The EPMs 114 may have a lower intrinsic coercivity than the permanent magnets 115. The lower intrinsic coercivity of EPMs 114 allows for each coil 116 to emit a magnetic field of sufficient strength to reverse a polarity of the magnetic field emitted by the respective EPM 114 without affecting the magnetization of the permanent magnets 115. For example, in some embodiments, an intrinsic coercivity of the permanent magnets 115 can be over ten times greater than an intrinsic coercivity of the EPMs 114. The lower intrinsic coercivity of the EPMs also reduces the amount of electrical energy needed to flip the polarity of EPMs 114, thereby allowing for more efficient operation of the stator 110.

To drive rotation of the rotor 106 and scroll wheel 104, current may be delivered to one or more of the EPMs 114 through the respective coil 116 to program a magnetization of the respective EPM 114 such that the magnetic poles of one or more of the EPMs are opposite or aligned with the magnetic poles of the one or more permanent magnets 115. If the poles are oriented in an opposite direction, the magnetic field concentrated to the rotor 106 through teeth 108, 112 may be eliminated and/or reduced, which may enable smooth scrolling of the scroll wheel 104 by the user, with no rotational force being applied by the stator 110. If the poles are oriented in the same direction, the magnetic field concentrated to the rotor 106 through teeth 108, 112 may cause an attractive or repulsive force, which may drive rotation of the rotor 106 and scroll wheel 104 independent of force applied by the user. This rotation may be used to maintain a constant rotation speed, or may be used to can accelerate/decelerate the rotor 106.

Peripheral device 100 may include at least one position sensor 118 that is configured to detect an angular position of the rotor 106 relative to the body 102 and/or other reference point of the peripheral device 100. For example, the position sensor 118 may be positioned proximate the scroll wheel 104 and may detect the magnetic field produced by a permanent magnet provided within the scroll wheel 104 (and outside of the stator 110). Based on the measured magnetic field, control circuitry, such as an electronic drive, may determine an angular position of the scroll wheel 104. Using a number of different measurements from the position sensor 118, the control circuitry may also determine a speed of rotation of the scroll wheel 104. The stator 110 and/or rotor 106 may include magnetic shielding such that the position sensor 118 does not sense the magnetic field generated by the stator 110 and/or rotor 106. In some embodiments, the position sensor 118 may include a Hall effect sensor, although other position sensors are possible in various embodiments. The position sensor 118 may have a sampling rate of at least 10 kHz, which may enable precise control of the timing of the delivery of current pulses to the stator 110.

The control circuitry may be configured to control delivery of current to the EPMs 114 of the stator 110 (such as via coil 116) to control a speed of the rotor 106 and scroll wheel 104. This may enable precise control of the electromagnet flux density in real time to control a motorized actuation (or braking) of the scroll wheel 104. For example, by precisely timing the delivery of pulses and using current vector control, the rotor 106 may be rotated by adjusting the magnetic field in the EPMs 114. The control circuitry may be able to provide at least two modes depending on the polarity of the electromagnet. For example, when the magnetic field is looped in the stator 110, the rotor 106 could freely rotate around the stator shaft. When the magnetic field is going on the rotor 106 via teeth, a feeling of notch may be perceived by the user.

The control circuitry may be configured to actuate the scroll wheel 104 to continue and/or adjust a speed of rotation of the scroll wheel 104 and/or may start rotation of the scroll wheel 104 from a fully static position. For example, to start rotation of the scroll wheel 104 from a static position, the control circuitry may apply a sequence of very short pulses in a random fashion that attracts or repels the rotor 106 to generate rotational motion of the rotor 106. More specifically, the magnetic field is not uniform between the rotor teeth 108 and the stator teeth 112 (such as due to the manufacturing tolerances) and therefore there is no single static position where the teeth 108, 112 are perfectly aligned. When the magnetization of at least one of the EPMs changes, the magnetic field variation creates an attraction force, which causes the scroll wheel 104 to rotate.

Figure 2:
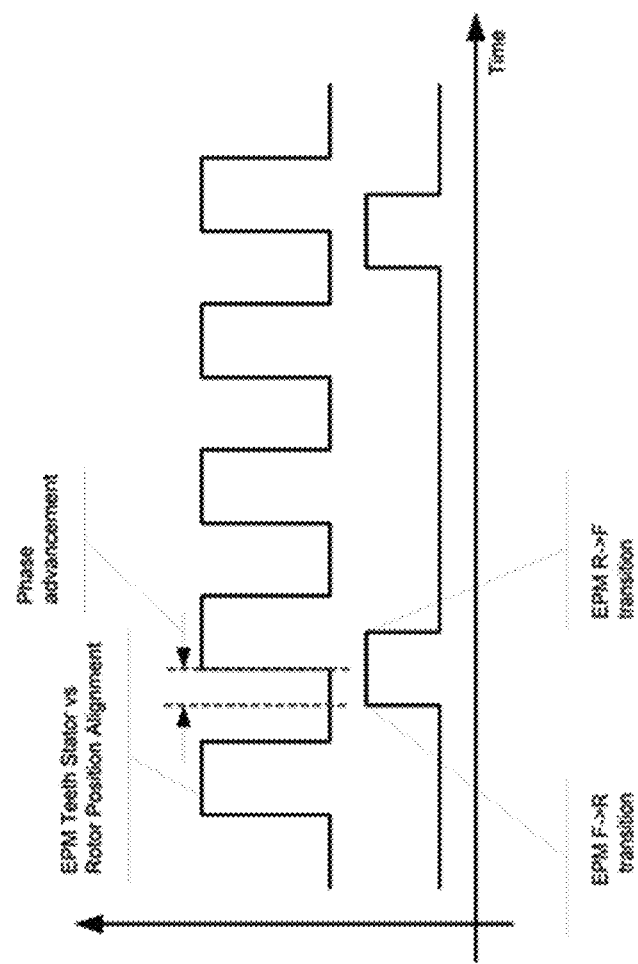
FIG. 2 is a graph illustrating phase positions of a motor of a scroll wheel according to embodiments of the present invention.

The control circuitry may utilize the phase difference between the teeth 108, 112 and the magnetization of one or more EPMs 114 to continue and/or adjust a speed of rotation of the scroll wheel 104. For example, if the phase difference between the teeth 108, 112 and the EPM magnetization events are controlled, the scroll wheel 104 may be accelerated or decelerated. If the phase difference (between the aligned teeth position and the magnetization/re-magnetization pulse) is ZERO, then a steady rotation speed of the scroll wheel 104 may be maintained. For example, as shown in the graph of FIG. 2, the Freewheel to Ratchet (F→R) transition kicks the rotor 106 due to the non-uniform magnetic coupling even from the static position. Ratchet to Freewheel (R→F) allows to use the wheel inertia and turn freely before another impulse will kick the scroll wheel 104 faster/slower.

As noted above, the control circuitry may utilize vector control to adjust the timing of the delivery of current pulses to one or more of the EPMs 114 to control the automated rotation of the scroll wheel 104. For example, the rotational plane (or vector) of each EPM 114 is the EPM's actual angular position, angular velocity, and acceleration, while the control plane is another vector. The goal of the control circuitry is to ensure the convergence of these two vectors by minimizing the error (the angular difference) between the two vectors.

To implement the motorized control of the scroll wheel 104, The instant position of the rotor 106 and/or each EPM 114 is observed via the position sensor 118. The operating mode (acceleration/deceleration/constant speed) defines the phase between the current position EPM vector (taken from the position sensor 118) and the actuation pulses. The actuation pulses are precisely managed. For example, if there are 24 teeth on the rotor 106 and the scroll wheel 104 turns at 300 rpm (or 5 rotations/sec) there are 5*24=120 positions/sec to resolve. Each position needs to have at least 4 phase angles (simplified): PI/2 for the acceleration, −PI/2 for deceleration, 0 for the same rotation speed and PI for braking. Hence, the phase resolution must be 120*4=480 events/sec for the scroll wheel 104 rotating at 300 RPM. Even when the scroll wheel 104 rotates at 1000 RPM, the event rate is less than 2 KHz or 500 µs per event. Within 500 µs it is important to have two back-to-back EPM cycles to magnetize in one direction and re-magnetize in the opposite direction the permanent magnet 115.

Figure 3:
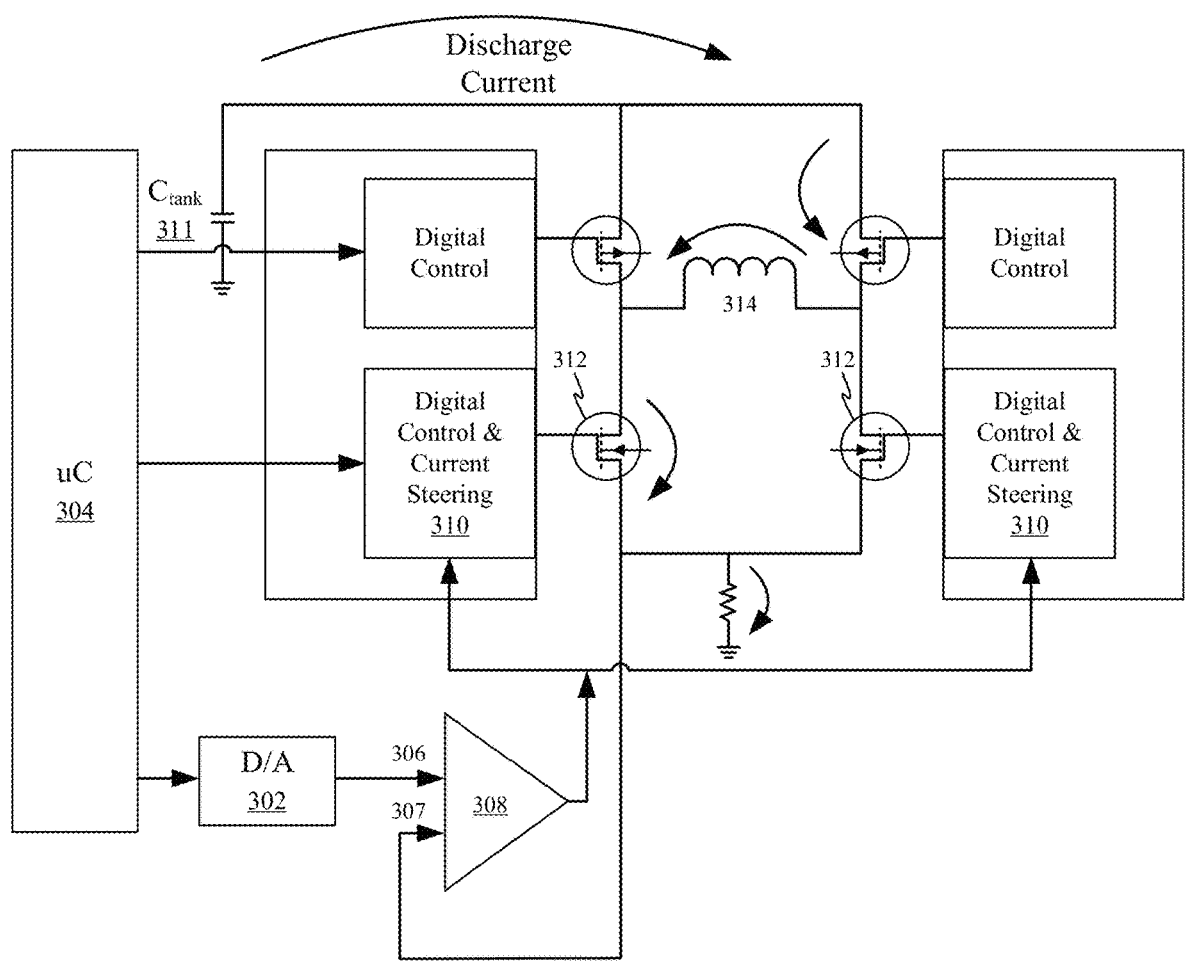
FIG. 3 illustrates a linear continuous current controller according to embodiments of the present invention.

FIG. 3 illustrates an exemplary linear continuous current controller (which may make up all or part of the control circuitry of the stator 110) for regulating current to one or more magnetizing coils of an electro permanent magnet. Digital/Analog converter 302 can be configured to receive an input signal from micro-controller 304 and convert the input signal into a current setting 306 that is received by error amplifier 308 where it is compared to an amount of current 307 being generated by the system. Current setting 306 is supplied for a duration sufficient to provide a desired amount of electrical energy. In some embodiments, digital/analog controller 302 can be replaced by a pulse width modulator and integrator/filter combination that generates the current setting 306 from the input signal. A difference between the current being supplied to the magnetizing coil 307 and current setting 306 is amplified by error amplifier 308 and then used to at least partially control operation of digital control & current steering modules 310. Digital control & current steering modules 310 are configured to receive input signals from micro capacitor 304 and then control operation of bipolar junction transistor (BJT) 312 based on inputs from microcontroller 304 and error amplifier 308. In this way, an amount of current received at magnetizing coil 314 from tank capacitor 311 can be controlled in accordance with current setting 306. Because the control system is electronic, the controller can be configured to change the resistance profile generated by an associated electropermanent magnet in response to user inputs or in response to cues provided by an application being manipulated by the user input device. For example, rotation of the rotary input control could be temporarily paused by actuating magnetizing coil 314. In some embodiments, each EPM 114 of the stator 110 may include a dedicated current controller, while in other embodiments one or more EPMs 114 may share a single current controller. For example, the drive system may be a 3-phase drive, and each phase may include a dedicated control circuit.

Figure 4B:
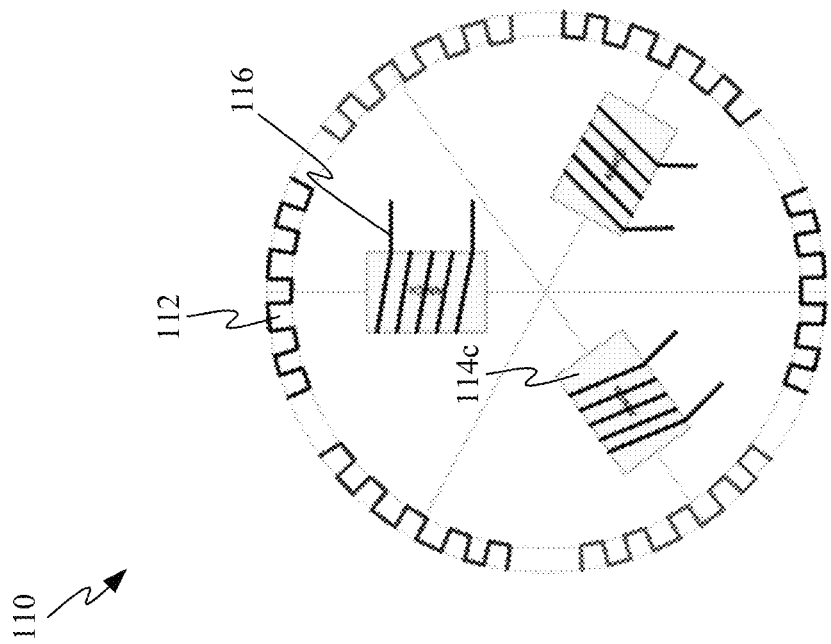
FIG. 4A-4D illustrate electro-permanent magnet configurations for a stator according to embodiments of the present technology.
Figure 4A:
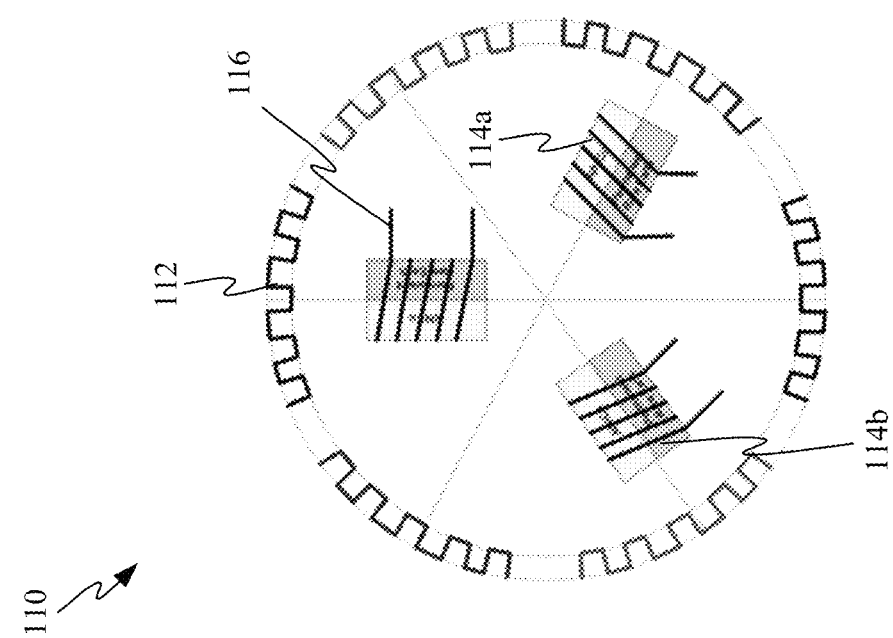

FIGS. 4A and 4B illustrate different configurations of EPMs 114 that may be utilized in stator 110. For example, as illustrated in FIG. 4A, the stator 110 may include a number of EPMs 114 (shown here with three, although any number of EPMs 114 may be used in various embodiments) arranged at equal angular intervals about the stator 110. Each EPM 114 may include a reversible EPM magnet 114$a$, such as an AlNiCo magnet, and a permanent magnet 114$b$, such as a neodymium magnet. For example, the reversible EPM magnet 114$a$ may have a lower coercivity than the permanent magnet 114$b$ such that a current pulse may be selected that alters the magnetic field of the reversible EPM magnet 114$a$ while not affecting the permanent magnet 114$b$. Pairs of magnets 114$a$, 114$b$ are provided within respective coils 116. The coupling of the reversible EPM magnet 114$a$ and permanent EPM magnet 114$b$ may produce a high stall torque, as the pairs of magnets may either produce magnetic field in one direction (if the poles are aligned) or produce no net magnetic field (if the poles are opposite). The maximum torque depends on many factors including the EPM magnet construction and its B-H curve, the air gap, the surface of the flux guides, the reluctance of the flux guides, etc.

FIG. 4B illustrates another embodiment of an EPM configuration within stator 110. For example, the stator 110 may include a number of EPMs 114 (shown here with three arranged in a triangular configuration, although any number of EPMs 114 may be used in various embodiments) arranged at equal angular intervals about the stator 110. Each EPM 114 may include a reversible EPM magnet 114$c$, such as an AlNiCo magnet, without the presence of any permanent magnets. Each EPM magnet 114$c$ may be provided within a respective coil 116. The use of only reversible EPM magnets 114$c$ may provide a lower stall torque, but may provide greater scroll wheel speeds. For example, by using only EPM magnets 114$c$, each EPM magnet 114$c$ may be magnetized along full range of polarity, which enables the poles of one or more of the EPM magnets 114$c$ to be reversible during a single rotation. For example, with three EPM magnets 114$c$, in a single rotation six poles may be used (each pole of each magnet) to drive faster rotation of the rotor 106. The maximum top speed (e.g., rpm) can be computed as 60/(3 phases*Tactuation*N teeth). For example, for a rotor 106 having 24 teeth 108 and having a 1 ms actuation time, the top speed=833 RPM.

In some embodiments, the maximum speed of the scroll wheel 104 may be at least 2400 rpm. The maximum available torque may be at least 10 mNm and the minimum stall torque may be 20 mNm.

Figure 4D:
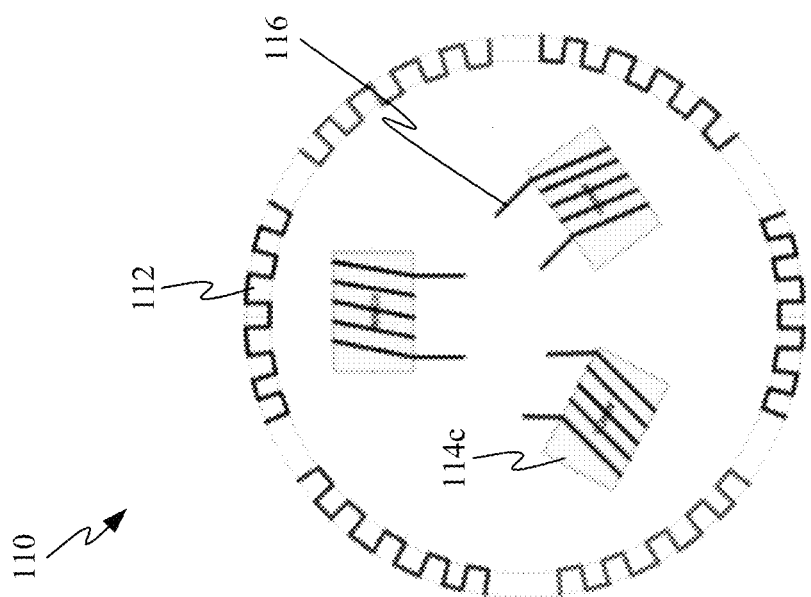
Figure 4C:
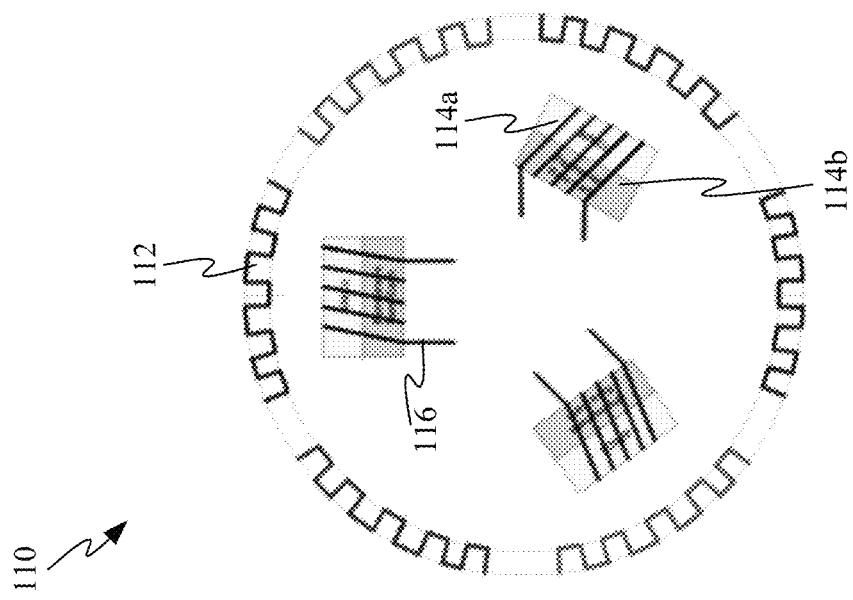

The EPMs 114 may be arranged within the stator 110 in a star configuration (e.g., with the longitudinal axes of the EPMs 114 being radially oriented) as shown in FIGS. 4A and 4B, or may be arranged in a triangular configuration (e.g., with the longitudinal axes of the EPMs 114 being orthogonal to radial lines) as shown in FIGS. 4C and 4D.

Figure 5:
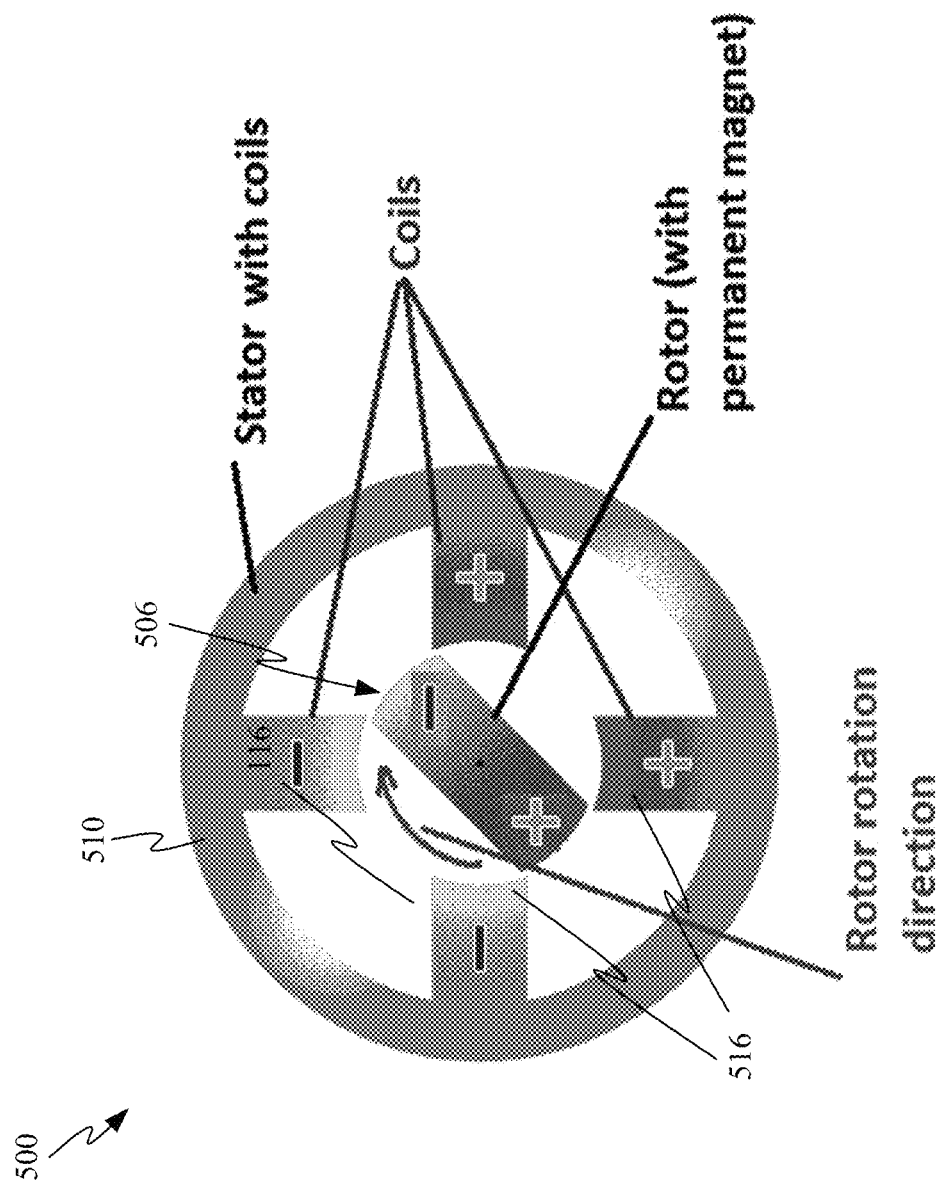
FIG. 5 illustrates a top plan view of a brushless DC motor for a scroll wheel according to embodiments of the present invention.
Figure 6:
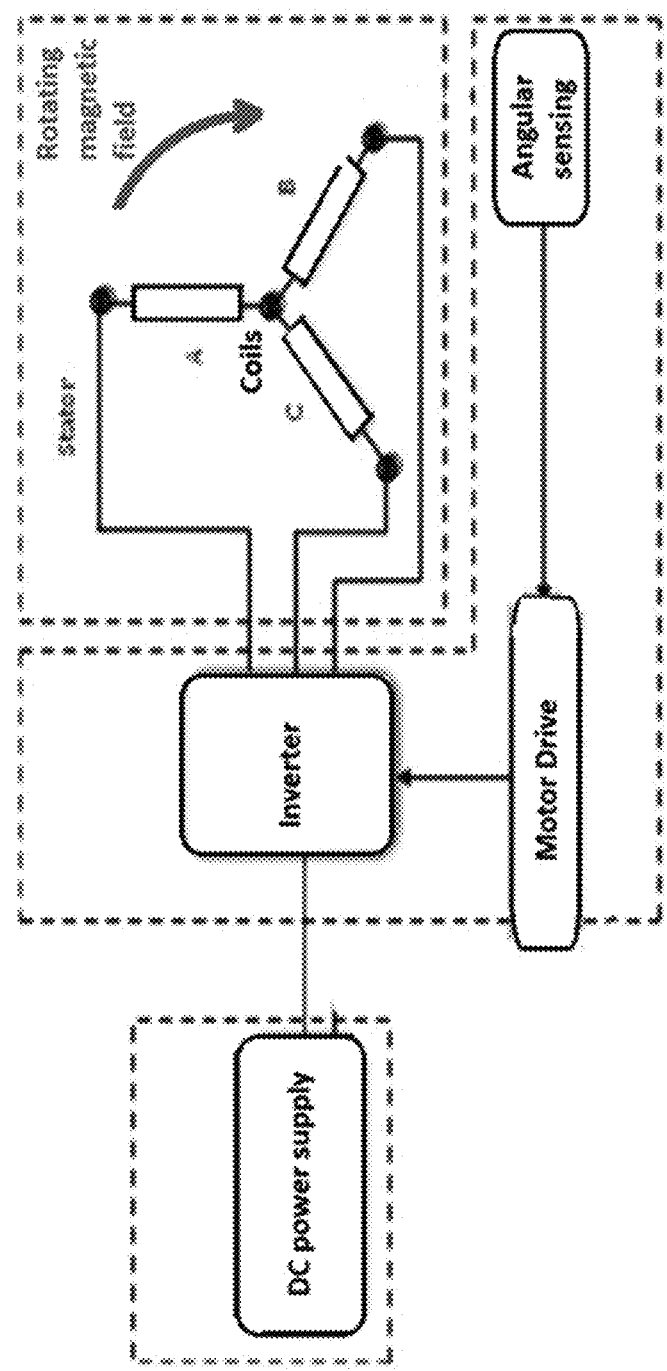
FIG. 6 illustrates a system architecture of the motor of FIG. 5 according to embodiments of the present invention.

In some embodiments, other motors may be utilized to drive the rotation of the scroll wheel 104. For example, as illustrated in FIG. 5, a brushless DC motor 500 may be used to rotate the rotor 506. The rotor 506 may include a number of permanent magnets and the stator 510 includes a number of coils 516. The motor 500 could be in-runner or out-runner (e.g., rotor 506 on the outside or on the inside). The external diameter of the scroll wheel 104 (e.g., the interface with the user's finger) always needs to be mechanically connected to the rotor 506. Control circuitry may generate a current in the stator coils 516, and therefore generate a magnetic field. By sequentially driving the coils 516, a rotating magnetic field is generated that may cause a corresponding rotation of the rotor 506 due to the simultaneous attraction and repulsion bye the rotating magnetic field. The current may go in both directions which may generate 2 magnetic poles (e.g., North or South) with the same coil 516. The control circuitry may be designed to generate a current in each coils 516 with correct timing, direction, and intensity such that the rotor 506 rotates with a desired speed, direction, and torque. The number of coils 516 and permanent rotor magnets may be adapted to needs. More coils 516/permanent rotor magnet may enable the rotor 506 to turn constantly and have a regular torque on one full rotation. A system architecture of the motor 500 is illustrated in FIG. 6.

Some advantages of using motor 500 are 1) a reduced motor size, 2) a simple mechanical construction which is easy to maintain, 3) a high level of reliability (due to no brushes) even at high operating speeds, 4) high motor efficiency (almost zero losses on the rotor 506), 5) a high torque-to-weight-ratio (e.g., torque density), 6) ability to precisely control torque and speed, 7) a fast dynamic response, and 8) a smooth torque production.

Figure 7A:
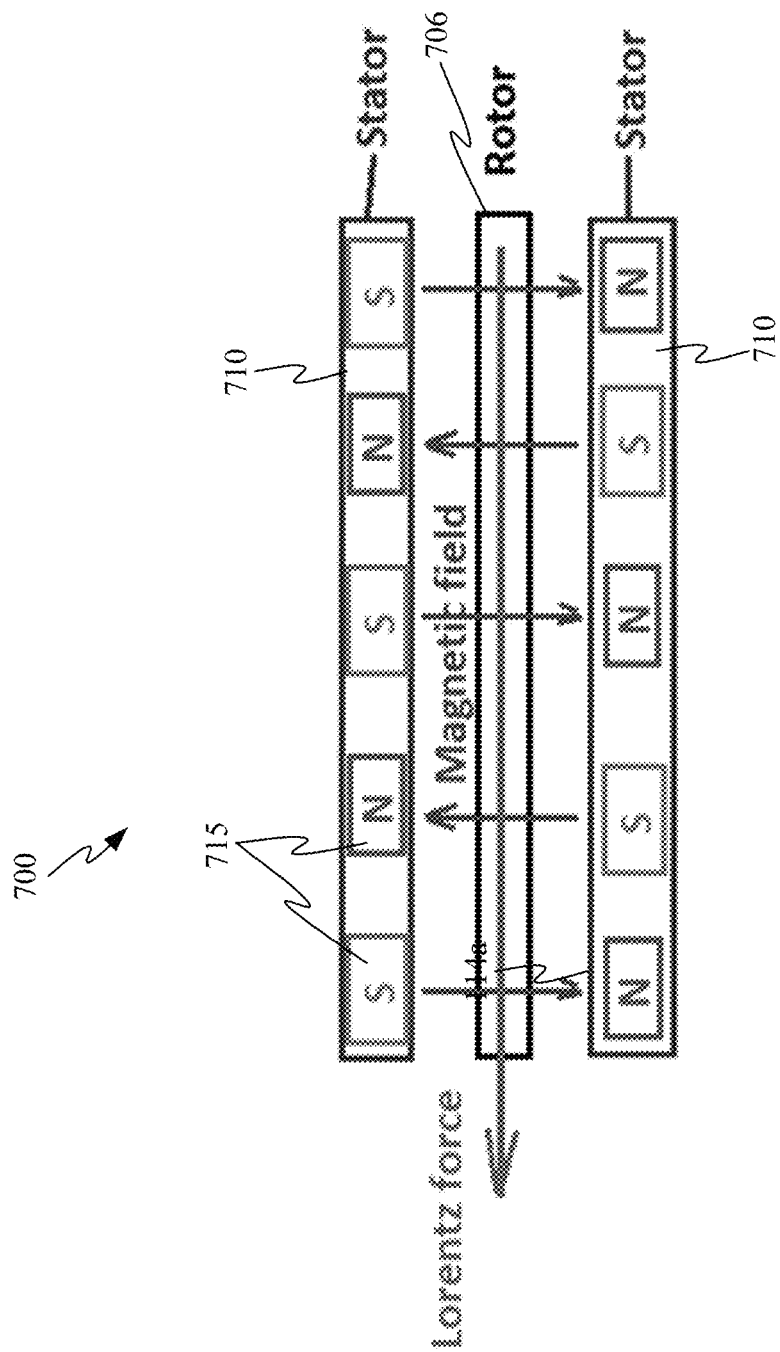
FIGS. 7A and 7B illustrate views of a pancake motor for a scroll wheel according to embodiments of the present invention.
Figure 7B:
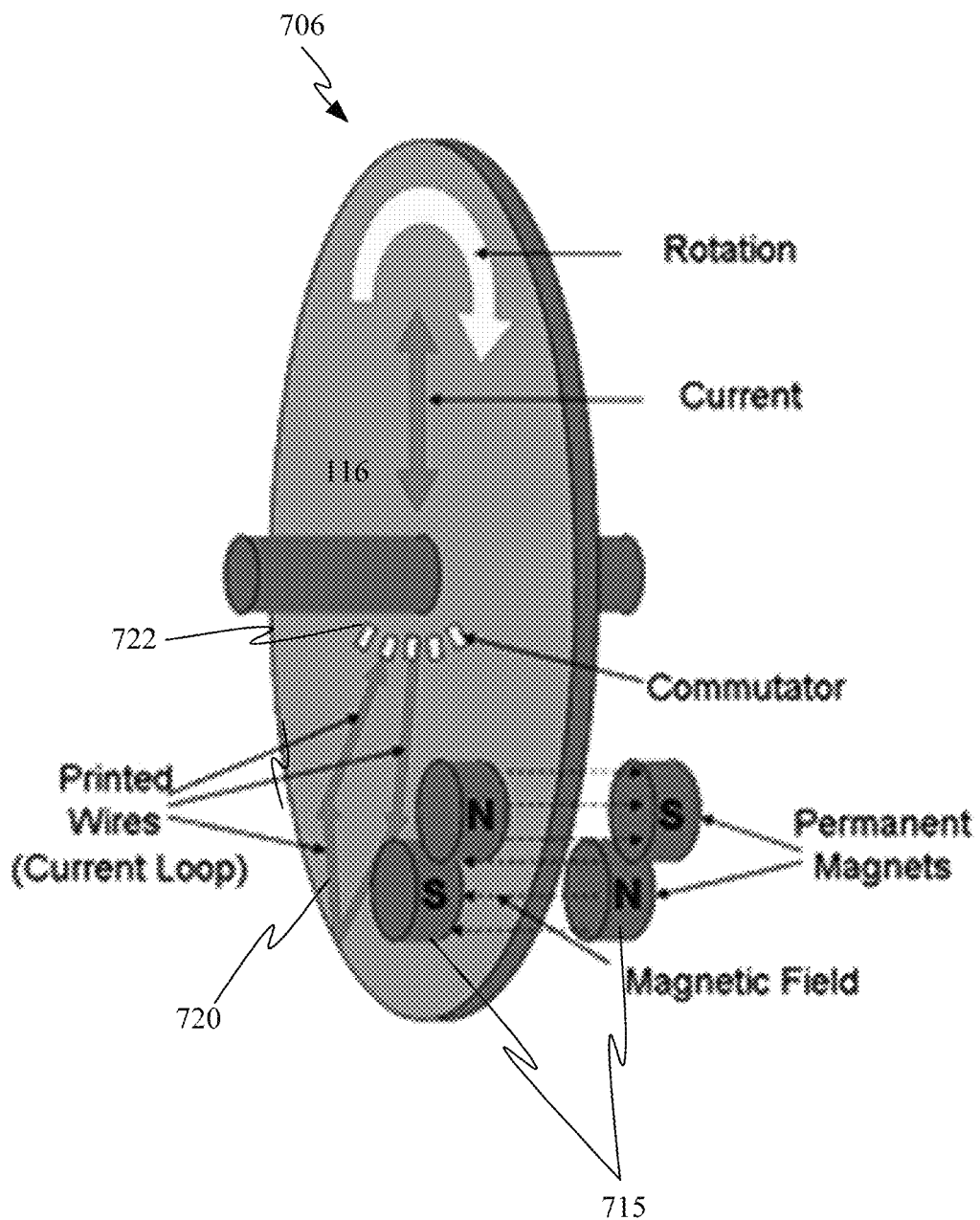
Figure 8:
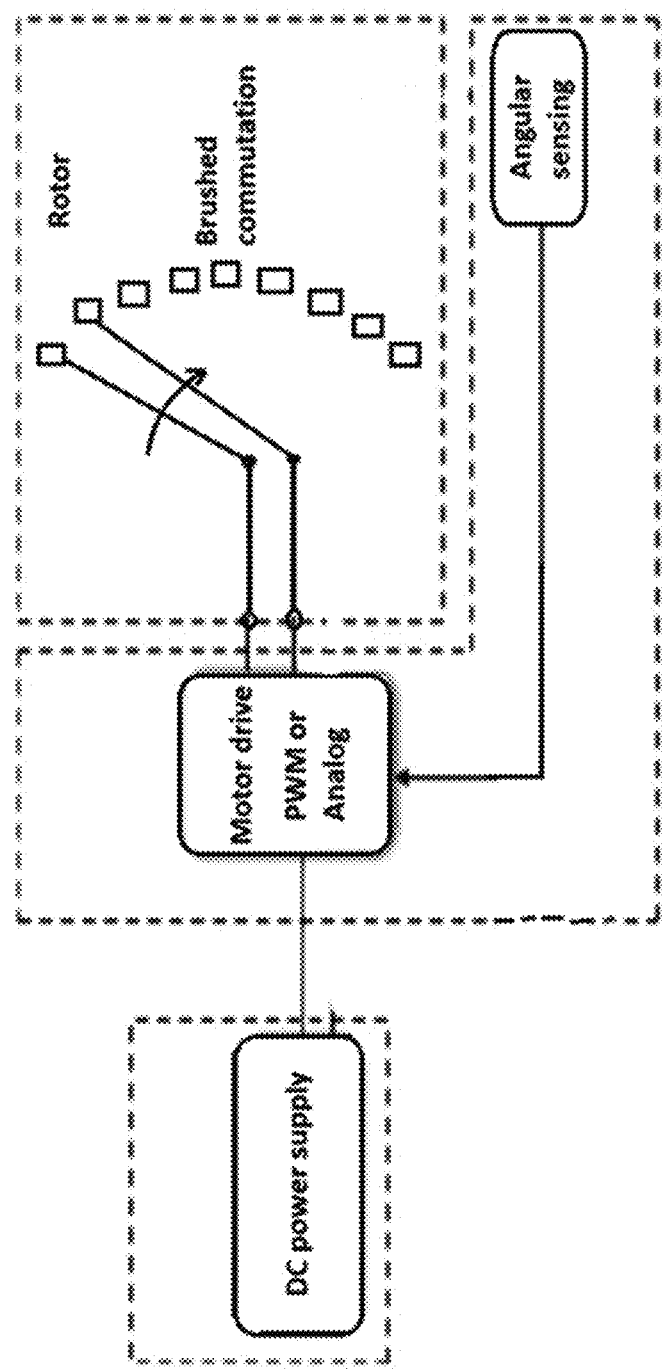
FIG. 8 illustrates a system architecture of the motor of FIG. 7 according to embodiments of the present invention.

As illustrated in FIGS. 7A and 7B, a pancake motor 700 having an axial magnetic field and axial air gap may be used to drive the rotation of the scroll wheel 104. For example, a rotor 706 may be formed of a non-magnetic material (e.g., PCB) with copper conductors 720. The rotor 706 may be located between two thin stator discs 710 containing permanent magnets 715. The magnets 715 may be arranged with alternating north and south poles so that the magnetic fields between adjacent pairs of magnets 715 oppose each other. On the rotor 706, current runs in the copper conductors 720 radially out from the center of the motor 700 to its periphery and back which create a perpendicular force (Lorentz force). Current is commutating in each printed wire/conductors 720 by a physical connection on commutators 722. The drive generates a current pattern (for example PWM) that will be going to the copper conductive wire 720 on the rotor 706 via brushes (not shown). This current may go in both directions to change rotation direction. A system architecture of the motor 700 is illustrated in FIG. 8.

The use of a pancake motor may enable a small footprint for the rotor/scroll wheel motor. Additionally, the rotor 706 does not need to include any iron, which helps avoid any cogging force on the system that may disrupt smooth motion of the scroll wheel 104.

By motorizing the scroll wheel 104, several functions may be enabled. For example, the scroll wheel 104 may be operated in an infinite freewheel configuration in which the scroll wheel 104 continues to rotate at a constant or variable speed until end of document is reached. For example, the position sensor 118 may detect a user input, such as a flick or other rotation of the scroll wheel 104 by the user. Based on the user input, the control circuitry may deliver one or more current pulses to one or more EPMs 114 of the stator 110 to drive rotation of the scroll wheel 104 without further input from the user. In some embodiments, current may be applied such that the motorized speed of the scroll wheel may match or substantially match the speed of the user input. In other embodiments, the current may be applied such that the motorized speed of the scroll wheel may be less than or greater than the speed of the user input. For example, upon receiving the user input, the control circuitry may apply a current to one or more of the EPMs 114 that causes the rotor 106 and scroll wheel 104 to accelerate and/or decelerate to a desired speed relative to the speed of the user input.

In some embodiments, a number of scroll wheel speed ranges may be set, with each scroll wheel speed ranges being associated with a unique drive speed. Upon detecting a speed of the user input, the control circuitry may determine which range the speed of the user input falls within. Based on the identified range of scroll wheel speeds, the control circuitry may deliver one or more pulses of current to one or more of the EPMs 114 of the stator 110 to drive rotation of the scroll wheel 104 at the drive speed associated with the identified range of scroll wheel speeds.

In some instances, the control circuitry may determine a context associated with the user's input based on one or more sensor measurements. For example, based on the rotation speed of the user input, a speed and/or force in a z-direction (e.g., vertical direction), and/or other measurement from one or more sensors (which may include position sensor 118 and/or other sensors), the control circuitry may determine whether the user wants to scroll to the bottom of the document/page or wants to scroll partway down. Based on the determined context of the user input, the current may be applied to generate a motorized rotation of the scroll wheel 104 that matches the context.

Upon reaching the end of the document, webpage, and/or other screen, the stator 110 may deliver pulses that cause the rotor 106 to brake. For example, software may alert the control circuitry that a bottom (or other scroll stop position) of the screen has been reached. At this point, the control circuitry may apply current to one or more of the EPMs to brake the scroll wheel 104 at the desired location.

While the use cases described above are primarily described in the context of the EPM-driven stator 110, it will be appreciated that similar functionality may be achieved with other motor systems including, but not limited to, the brushless DC motor 500 and pancake motor 700 described herein.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A peripheral device, comprising:
    a body;
    a scroll wheel rotatably coupled with the body, the scroll wheel comprising a ferromagnetic rotor, wherein:
        the ferromagnetic rotor is generally annular and defines an open interior; and
        the ferromagnetic rotor defines a first plurality of teeth arranged about a periphery of the open interior;
    a stator disposed within the open interior of the ferromagnetic rotor, the stator defining a second plurality of teeth that are at least substantially alignable with the first plurality of teeth, wherein the stator comprises at least one permanent magnet and a plurality of electro-permanent magnets, wherein each of the plurality of electro-permanent magnets is disposed within a conductive coil;
    a position sensor that is configured to detect an angular position of the ferromagnetic rotor; and
    control circuitry that is configured to:
    deliver one or more pulses of current to the plurality of electro-permanent magnets of the stator to alter a magnetic field exhibited between the first plurality of teeth of the rotor and the second plurality of teeth of the rotor, thereby causing a net attractive or repulsive magnetic field to rotate the rotor and scroll wheel relative to the body, wherein:
    the control circuitry is configured to:
        determine a first speed of the scroll wheel from a user input based on a plurality of measurements from the position sensor;
        identify a range of scroll wheel speeds of a plurality of scroll wheel speed ranges the first speed falls within, wherein each of the plurality of scroll wheel speed ranges is associated with a unique drive speed; and
        deliver one or more pulses of current to the plurality of electro-permanent magnets of the stator to drive rotation of the scroll wheel at the drive speed associated with the identified range of scroll wheel speeds.

2. The peripheral device of claim 1, wherein:
    the control circuitry is configured to:
        determine a speed of the scroll wheel from a user input based on a plurality of measurements from the position sensor; and
        deliver one or more pulses of current to the plurality of electro-permanent magnets of the stator to drive rotation of the scroll wheel at the speed.

3. The peripheral device of claim 2, wherein:
    the control circuitry is configured to:
        receive a signal indicating that an end of a screen has been reached; and
        adjust the delivery of the one or more pulses of current to the plurality of electro-permanent magnets of the stator to stop the rotation of the scroll wheel.

4. The peripheral device of claim 1, wherein:
    the control circuitry is configured to:
        determine a first speed of the scroll wheel from a user input based on a plurality of measurements from the position sensor; and
        deliver one or more pulses of current to the plurality of electro-permanent magnets of the stator to drive rotation of the scroll wheel at a second speed that is different than the first speed.

5. The peripheral device of claim 1, wherein:
the position sensor has a sampling rate of at least 10 kHz.

6. The peripheral device of claim 1, wherein:
the plurality of electro-permanent magnets comprise three electro-permanent magnets arranged in a triangular configuration.

7. The peripheral device of claim 1, wherein:
each of the plurality of electro-permanent magnets is coupled with a respective permanent magnet that is disposed within the respective conductive coil.

8. A computer peripheral device comprising:
a body;
a scroll wheel coupled to the body;
an electric motor comprising at least two portions, wherein:
   a first portion of the electric motor is coupled to the scroll wheel;
   a second portion of the electric motor is coupled to the body; and
   the electric motor is configured to drive rotation of the scroll wheel including acceleration and deceleration of the scroll wheel.

9. The computer peripheral device of claim 8, wherein:
the electric motor is further configured to drive rotation of the scroll wheel at a constant speed that is proportional to an external rotational input applied to the scroll wheel.

10. The computer peripheral device of claim 8, wherein:
the electric motor is further configured to drive rotation of the scroll wheel at a constant speed that is greater than an external rotational input applied to the scroll wheel.

11. The computer peripheral device of claim 8, wherein:
the electric motor is further configured to drive rotation of the scroll wheel at a constant speed that is less than an external rotational input applied to the scroll wheel.

12. The computer peripheral device of claim 8, wherein:
the electric motor is further configured to accelerate the rotational speed of the scroll wheel relative to the speed of an external rotational input applied to the scroll wheel.

13. The computer peripheral device of claim 8, wherein:
the electric motor is further configured to decelerate the rotational speed of the scroll wheel relative to the speed of an external rotational input applied to the scroll wheel.

14. The computer peripheral device of claim 8, wherein:
the computer peripheral device is in data communication with a host device; and
the electric motor is further configured to drive the rotational speed of the scroll wheel based at least in part on an event occurring on the host device and data related to the event being communicated to the computer peripheral device.

* * * * *